(12) United States Patent
Koroa et al.

(10) Patent No.: US 11,256,736 B2
(45) Date of Patent: Feb. 22, 2022

(54) PERSONALIZED IMAGE RECOGNITION

(71) Applicant: MERCARI, INC., Tokyo (JP)

(72) Inventors: Arnold Christopher Koroa, Tokyo (JP); Takuma Yamaguchi, Tokyo (JP)

(73) Assignee: MERCARI, INC., Tokyo (JP)

( * ) Notice: Subject to any disclaimer, the term of this patent is extended or adjusted under 35 U.S.C. 154(b) by 36 days.

(21) Appl. No.: 16/824,385

(22) Filed: Mar. 19, 2020

(65) Prior Publication Data

US 2021/0294835 A1 Sep. 23, 2021

(51) Int. Cl.
*G06F 16/532* (2019.01)
*G06F 16/535* (2019.01)
*G06F 16/538* (2019.01)
*G06F 16/583* (2019.01)

(52) U.S. Cl.
CPC .......... *G06F 16/532* (2019.01); *G06F 16/535* (2019.01); *G06F 16/538* (2019.01); *G06F 16/583* (2019.01)

(58) Field of Classification Search
CPC ...... G06F 16/2379; G06F 9/466; G06F 40/30; G06F 16/951; G06F 3/0482; G06F 16/182; G06F 16/906; G06F 16/9538; G06F 17/18
See application file for complete search history.

(56) References Cited

U.S. PATENT DOCUMENTS

| | | | |
|---|---|---|---|
| 10,140,515 B1* | 11/2018 | Waldo | G06K 9/6273 |
| 2016/0360382 A1* | 12/2016 | Gross | G06F 3/04883 |
| 2018/0314689 A1* | 11/2018 | Wang | G10L 15/07 |
| 2019/0236371 A1* | 8/2019 | Boonmee | G06K 9/00765 |
| 2019/0325084 A1* | 10/2019 | Peng | G06F 16/9535 |

* cited by examiner

*Primary Examiner* — Angelica Ruiz
(74) *Attorney, Agent, or Firm* — Morgan, Lewis & Bockius LLP

(57) ABSTRACT

Technologies generally described herein relate to a computing device for personalized image recognition scheme. Example computing devices may include at least one processor; and at least one memory. The at least one memory may store instructions. The at least one processor executes the instructions to perform operations. The operations may comprise obtaining an input image containing an object and a user identifier; preprocessing the input image to produce image feature data; preprocessing user information corresponding to the user identifier to produce user feature data; determining a user group based on the user feature data to obtain group feature data of the user group; conducting a search of an image database based on the image feature data and the group feature data to search for one or more images; and generating object information based on image information of the one or more images.

20 Claims, 11 Drawing Sheets

FIG. 4

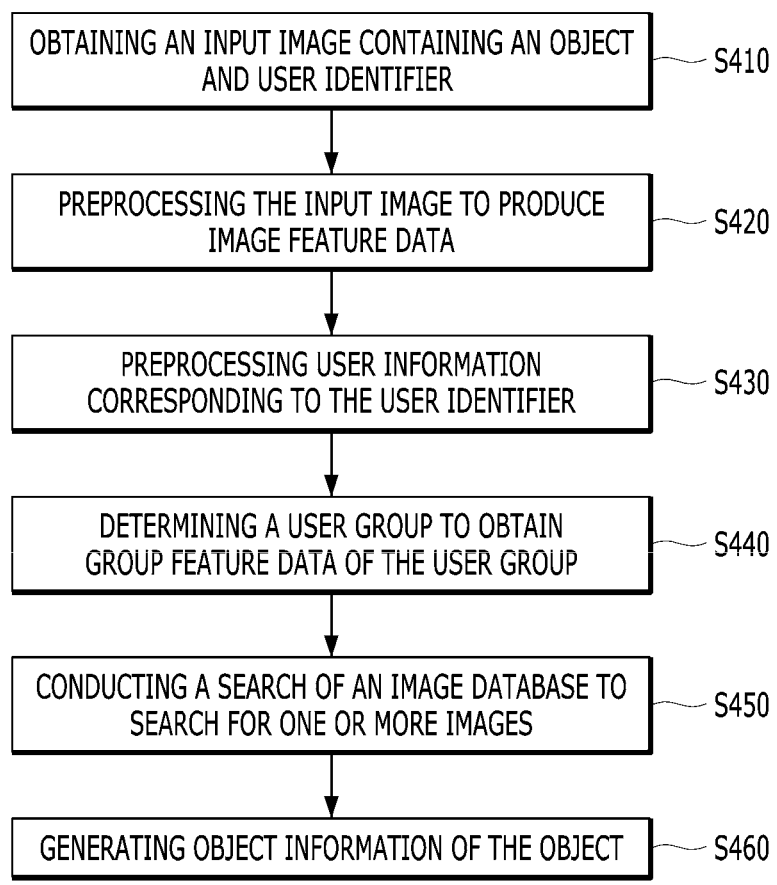

- OBTAINING AN INPUT IMAGE CONTAINING AN OBJECT AND USER IDENTIFIER — S410
- PREPROCESSING THE INPUT IMAGE TO PRODUCE IMAGE FEATURE DATA — S420
- PREPROCESSING USER INFORMATION CORRESPONDING TO THE USER IDENTIFIER — S430
- DETERMINING A USER GROUP TO OBTAIN GROUP FEATURE DATA OF THE USER GROUP — S440
- CONDUCTING A SEARCH OF AN IMAGE DATABASE TO SEARCH FOR ONE OR MORE IMAGES — S450
- GENERATING OBJECT INFORMATION OF THE OBJECT — S460

| Group Name | Group Vector | Users | Image Vectors | Category | Brand | |
|---|---|---|---|---|---|---|
| Group 1 | 2.45.7.12. ... | 12353, 15415, ... | 66.23.45.76.12 ...<br>67.73.54.19.65 ...<br>... | A, B, C | a, b | ... |
| Group 2 | 2.34,1,34 ... | 54212, 34112, ... | 02.09.49.75.98 ...<br>64.87.98.26.59 ...<br>... | A, C, D | c, d | |
| ... | | | | | | |

PERSONALIZED IMAGE RECOGNITION

BACKGROUND

Unless otherwise indicated herein, the approaches described in this section are not prior art to the claims in this application and are not admitted to be prior art by inclusion in this section.

Commercial transactions through a network, so called e-commerce, have been increased over recent years, and their market is expected to be increased more and to gradually substitute for a conventional offline market in the future. In order to advertise or sell any item online, one or more images and specification for the item are typically posted on an online marketplace. The specification for the item may include, for example, a category, a brand name, an item name and other details of the item. Since there are various kinds of products and each product has different specification, it is time-consuming and tiresome for users to specify the item to be posted and describe the specification, and there could be errors in the users' descriptions. Meanwhile, when a user is trying to search an item for purchase, it is required to make a search query in order to specify the item, and thus similar problems as the above may arise.

In order to support a user to describe the item, utilization of image recognition techniques has been considered. In some examples, a user may upload an image containing an item for recognition, and an image recognition system may produce prediction for details of the item from the uploaded image. However, it is found that for many of uploaded images, the system is not able to make prediction with high-enough confidence. It appears to result from several reasons that, for example, some items shown in the uploaded images are difficult to be differentiated (e.g., between male jeans and female jeans) or such items are belong to multiple categories (e.g., some toys belong to both of soft toys and character goods), etc.

SUMMARY

Technologies generally described herein relate to provide a personalized image recognition scheme. Various exemplary methods using one or more computing devices are described. Example methods may include obtaining, using one or more computing devices, an input image containing an object and a user identifier for a user; preprocessing, using the one or more computing devices, the input image to produce image feature data of the input image; preprocessing, using the one or more computing devices, user information corresponding to the user identifier to produce user feature data of the user, wherein the user information and the user feature data are stored in a user database; determining, using the one or more computing devices, a user group based on the user feature data to obtain group feature data of the user group, wherein the user group and the group feature data are stored in the user database; conducting, using the one or more computing devices, a search of an image database based on the image feature data and the group feature data to search for first one or more images; and generating, using the one or more computing devices, first object information of the object based on image information of the first one or more images. In some examples, the methods may further comprise conducting, using the one or more computing devices, a search of the image database based on the image feature data to search for second one or more images; and generating, using the one or more computing devices, second object information of the object based on image information of the second one or more images. In some examples, the generating of the first object information may include determining a confidence value of the first object information, and the methods may further comprise comparing the confidence value and a predetermined value; and in response to the determination that the confidence value is higher than the predetermined value, selecting the first object information as object information of the object.

In some examples, computing devices for providing image recognition are described. Example computing devices may include at least one processor; and at least one memory. The at least one memory may store instructions, and the at least one processor may execute the instructions to perform operations. The operations may comprise obtaining an input image containing an object and a user identifier for a user; preprocessing the input image to produce image feature data of the input image; preprocessing user information corresponding to the user identifier to produce user feature data of the user, wherein the user information and the user feature data are stored in a user database; determining a user group based on the user feature data to obtain group feature data of the user group, wherein the user group and the group feature data are stored in the user database; conducting a search of an image database based on the image feature data and the group feature data to search for first one or more images; and generating first object information of the object based on image information of the first one or more images.

In some examples, a non-transitory computer-readable storage medium is described. The exemplary non-transitory computer-readable storage medium may store instructions executable by a computing device to cause the computing device to perform operations. The operations may include obtaining an input image containing an object and a user identifier for a user; preprocessing the input image to produce image feature data of the input image; preprocessing user information corresponding to the user identifier to produce user feature data of the user, wherein the user information and the user feature data are stored in a user database; determining a user group based on the user feature data to obtain group feature data of the user group, wherein the user group and the group feature data are stored in the user database; conducting a search of an image database based on the image feature data and the group feature data to search for first one or more images; and generating first object information of the object based on image information of the first one or more images.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates an exemplary flow diagram of a process for providing image recognition, arranged in accordance with at least some embodiments described herein;

FIG. 7A shows a portion of a user database and FIG. 7B shows another portion of the user database, arranged in accordance with at least some embodiments described herein;

DETAILED DESCRIPTION

Figure 1:
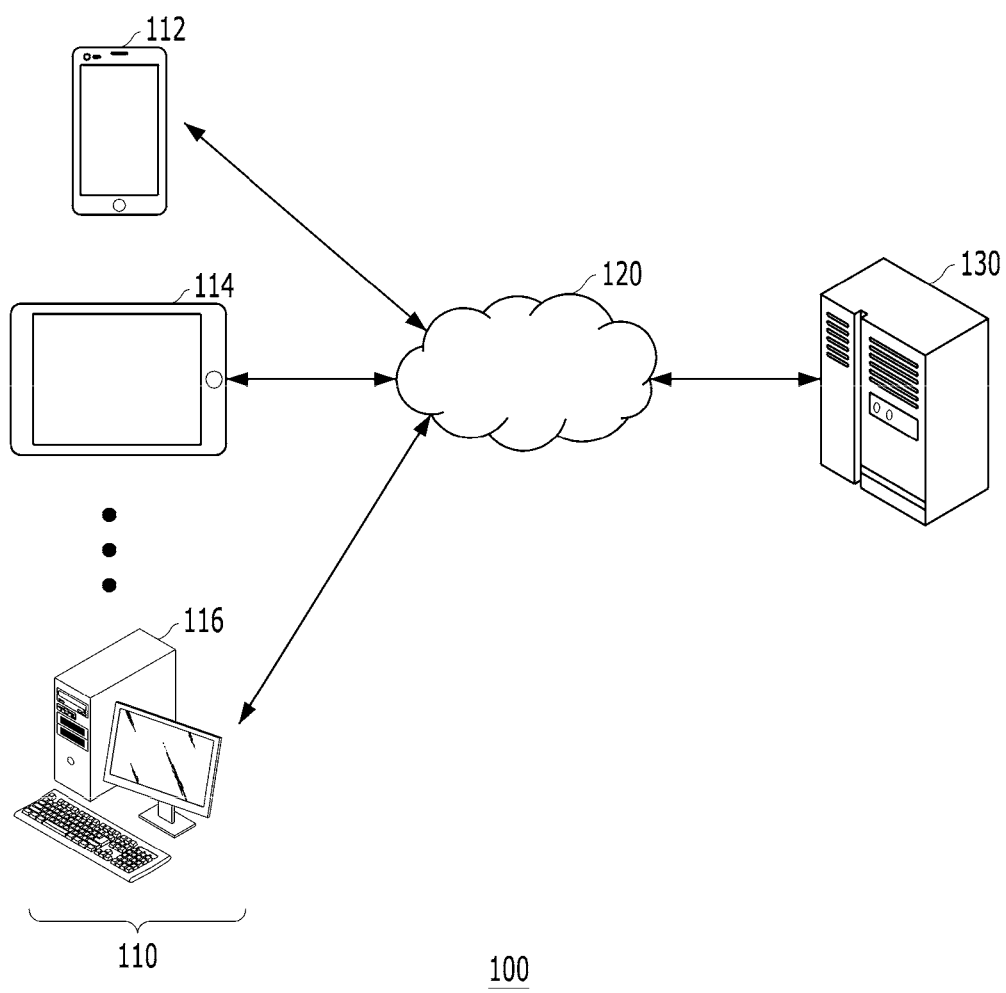
FIG. 1 shows a diagram of an exemplary image recognition system where a user device is configured to communicate with a server via a network, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, systems, devices and computer-readable storage media related to image recognition.

Briefly stated, technologies are generally described for providing a personalized image recognition scheme. In some examples, a user may want to post an object, such as his/her possession, on an online marketplace for sale by using a user device. The post of the object may include object information describing the object. The object information may include for example, a category, a brand name and/or some details of the object. The user may choose an input image containing the object using the user device. The input image may be captured by a camera associated with the user device, read from a memory of the user device, or retrieved through a network, such as the Internet.

In some embodiments, the user device may transmit the input image together with a user identifier for the user to a server. The server may receive the input image with the user identifier. The server may preprocess the input image and extract an image feature data from the preprocessed input image. Further, the server may obtain user information corresponding to the user identifier from a user database. The user database may store user identifiers and user information of multiple users and group the multiple users into a plurality of user groups. The server may preprocess the obtained user information to produce user feature data of the user. The server may determine a user group based on the user feature data and obtain group feature data of the determined user group.

The server may conduct a search of an image database based on the image feature data and the user-related data to search for first one or more images. For example, the user-related data may include, but not limited to, the user identifier, the user information, the user feature data, the group feature data and/or any information relating to the determined user group. In an example, the server may conduct the search based on the image feature data and the group feature data. The server may generate first object information of the object based on image information of the first one or more images. Further, the server may determine a confidence value of the first object information. Meanwhile, the server may conduct a search of the image database based on the image feature data only (i.e., not based on the group feature data) to search for second one or more images. The server may generate second object information of the object based on image information of the second one or more images. When the determined confidence value is higher than a predetermined value, the server may select the first object information as object information of the object. Otherwise, the server may select the second object information as the object information. The selected object information may be utilized for prediction of detailed item information. In some examples, the server may provide the object information to the user device, and the user device may present the object information on its screen to assist user's input.

In some other embodiments, the user device may preprocess the input image and extract an image feature data from the preprocessed input image, instead of transmitting the input image to the server. In such embodiments, the user device may obtain and/or store data of the user group corresponding to the user. In some examples, the user device may receive the data of the user group from the server, and update the user group, for example, periodically. The user device may conduct a search of an image database based on the image feature data and the user-related data to search for first one or more images and generate first object information of the object based on the first one or more images. Further, the user device may determine a confidence value of the first object information. When the determined confidence value is higher than a predetermined value, the user device may present the first object information on its screen to assist user's input. Otherwise, the user device may transmit, to the server, image related data (e.g. the input image and/or the image feature data) and the user-related data (e.g., the user identifier, the user information, the user feature data, the group feature data and/or any information relating to the determined user group). Then, the server may conduct a search of the image database based on the image feature data only (i.e., not based on the group feature data) to search for second one or more images. The server may generate second object information of the object based on image information of the second one or more images and return the second object information to the user device.

In some other cases that the user wants to purchase the object, the server may formulate, based on the object information, a search query to search for one or more objects associated with the object contained in the input image and provide the user device with a search result for the searched one or more objects.

FIG. 1 shows a diagram of an exemplary image recognition system where a user device is configured to communicate with a server via a network, arranged in accordance with at least some embodiments described herein. As depicted, an image recognition system 100 may include a user device 110, a network 120 and a server 130.

User device 110 may be any type of computing device, such as a user device 112, 114, . . . or 116 that is configured to communicate with server 130 via network 120. User device 110 may download, via network 120, an application program that provides an image recognition service according to the present disclosure from server 130 and/or other external devices (not shown), for example, an application providing server, such as Google Play Store, App Store, etc. Various types of user device 110 may include, but are not limited to, a desktop computer, a mobile computer (e.g., a laptop, a ultra-book, a netbook), a mobile phone (including a smart phone), a tablet computer and/or a personal digital assistant (PDA).

User device 110 may access server 130 via network 120. Network 120 may be any wired network, wireless network, or combination thereof. In addition, network 120 may include, but not limited to, a personal area network, a local area network, a wide area network, a cable network, a satellite network, a cellular telephone network, or combination thereof. For example, network 120 may be a publicly accessible network of linked network, possibly operated by various distinct parties, such as the Internet. In some embodiments, network 120 may be a private or semi-private network, such as a corporate or university intranet. Network 120 may include one or more wireless networks, such as a Code Division Multiple Access (CDMA) network, a Long Term Evolution (LTE) network, a Long Term Evolution-Advanced (LTE-A) network, Interoperability for Microwave Access (WiMax) network, Wireless Fidelity (Wi-Fi) network and any other type of wireless network. For example, the protocols used by network 120 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Server 130 may be implemented as a single computing device, a server farm comprising multiple servers, a distributed network, a cloud-computing configuration, and/or the like. Server 130 may comprise one or more processors and a memory. Server 130 and/or other computing devices communicatively connected to server 130 may include an image database and/or a user database. In some examples, the image database may store a plurality of images, each of which contains an item. Further, the image database may also store image feature data of each stored image. The image feature data may include at least one of, for example, feature vectors, graphs and images. In some examples, the user database may store user identifiers and user information for a plurality of users. User information may include at least one of demographic information and behavior information. The demographic information may include, for example, age, gender, location, address, profession, etc. The behavior information may include, for example, visited categories, preferred brand names, browsing history, application usage frequency, purchased history, etc.

In some examples, server 130 may be configured to produce user feature data of each of a plurality of users based on his/her user information, as will be described more details in below. Further, server 130 may be configured to group the plurality of users stored in the user database into a plurality of user groups based on user information of each of the plurality of users and extract group feature data of each user group based on user information of one or more users in a same group. As such, in addition to the user identifiers and user information, the user database may also store user feature data for each user, group information of each of the plurality of user groups and the plurality of group feature data. The user feature data and the group feature data may include, for example, one or more feature vectors. Server 130 may be configured to update the user database with a predetermined frequency. Server 130 may update at least one of user information, user feature data, user groups and group feature data.

User device 110 may obtain an input image. The input image may include an object, for example, to be posted or advertised or to be purchased. User device 110 may display the input image on a display screen associated with user device 110 such that the user can confirm the input image. In some embodiments, user device 110 may transmit the input image to server 130 via network 120. Server 130 may be configured to obtain the input image and a user identifier. The user identifier may be associated with a user of user device 110 or user device 110. Server 130 may be configured to receive the input image with the user identifier.

Server 130 may be configured to preprocess the input image to produce image feature data of the input image. The preprocessing of the input image may include, for example, resizing the input image, segmenting the input image, cropping the input image, transforming the input image, changing colors of the input image, brightness of the input image, contrasts of the input image, etc. to facilitate producing the image feature data. Server 130 may preprocess the input image and extract the image feature data from the input image. The extracted image feature data may be related to the object contained in the input image. The image feature data may include at least one of, for example, vectors, graphs and images.

Server 130 may be configured to preprocess user information corresponding to the user identifier to produce user feature data of the user. In some examples, server 130 may search for the user identifier from a user database and read user information corresponding to the user identifier. Server 130 may encode the user information, for example, using multi-hot encoding techniques to produce the user feature data and quantize the user feature data to adjust or reduce the size or the length of the user feature data. Server 130 may store the produced user feature data in the user database.

Server 130 may be configured to determine a user group associated with the user based on the user feature data. In some examples, server 130 may read each group feature data of each user group of the plurality of user groups stored in the user database and calculate a difference between the user feature data and the group feature data, such as a vector distance. Server 130 may determine whether the calculated difference is within a predetermined value, and when the calculated difference is within the predetermined value, server 130 may determine such user group as a user group associated with the user. In some examples, when two or more user groups are determined, server 130 may select one user group with minimum difference as the user group associated with the user.

Server 130 may be configured to conduct a search of the image database based on the image feature data and user-related data to search for first one or more images. For example, the user-related data may include, but not limited to, the user identifier, the user information, the user feature data, the group feature data and/or any information relating to the determined user group. In an example, server 130 may conduct the search based on the image feature data and the group feature data of the determined user group. In some examples, the user database may store image listing history and/or item listing history for each user group. Server 130 may read the image listing history and/or item listing history based on the group feature data and determine a plurality of images stored in the image database. Then, server 130 may compare the image feature data relating to the object in the input image with feature data of each of the determined plurality of images. When difference between the image feature data relating to the object and the feature data of an image stored in the image database is within a predetermined value, server 130 may determine a corresponding image as one of the first one or more images relating to the object.

Server 130 may be configured to generate first object information of the object based on image information of the first one or more images. The image database may store image information for each image, and the image information may include, for example, a title of the image, a category of an item in the image, a brand name of the item, detail descriptions of the item, etc. Server 130 may read image information of the first one or more images from the image database. In some examples, server 130 may determine one of the first one or more images based on similarity value with the input image and obtain image information of the determined image as the object information. In some other examples, server 130 may obtain image information of the first one or more images as the object information. Server 130 may select information for each feature of the object, such as a title, a category, a brand name, detail descriptions, etc., to generate the object information.

In further some embodiments, in addition to search for first one or more images, server 130 may be configured to conduct a search of the image database based on the image feature data but not based on user feature data or group feature data. In some examples, server 130 may compare the image feature data relating to the object in the input image with feature data of images stored in the image database. When difference between the image feature data relating to the object and the feature data of an image stored in the image database is within a predetermined value, server 130 may determine a corresponding image as one of second one or more images relating to the object and generate second object information of the object based on image information of the second one or more images.

In some examples, when generating the first object information, server 130 may determine a confidence value of the first object information. Server 130 may compare the confidence value and a predetermined confidence value. When the confidence value of the first object information is higher than the predetermined confidence value, server 130 may select the first object information as a result of image recognition. Otherwise, if the confidence value of the first object information is not higher than the predetermined confidence value, server 130 may select the second object information as the result of image recognition.

In some examples that the user of user device 110 is posting or selling the object, server 130 may transmit at least some portion of the object information to user device 110. In some other examples that the user of user device 110 is purchasing some items associated with the object contained in the input image, server 130 may formulate a search query to search for one or more objects associated with the object based on the object information. In such examples, server 130 may further conduct a search for the one or more objects based on the search query and return the search result to user device 110.

Although, it is described in the above that server 130 preprocesses the input image, other embodiments that user device 110 preprocesses the input image and in turn, generate the first object information are also possible. In some other embodiments, user device 110 may preprocess the input image and extract an image feature data from the preprocessed input image, instead of transmitting the input image to the server. User device 110 may obtain and/or store data of the user group corresponding to the user. In some examples, user device 110 may receive the data of the user group from server 130 and update the user group, for example, periodically. User device 110 may conduct a search of an image database based on the image feature data and the user-related data to search for first one or more images and generate first object information of the object based on the first one or more images. Further, user device 110 may determine a confidence value of the first object information. When the determined confidence value is not higher than a predetermined value, user device 110 may transmit, to server 130, image related data (e.g., the input image and/or the image feature data) and the user-related data (e.g., the user identifier, the user information, the user feature data, the group feature data and/or any information relating to the determined user group). Then, server 130 may conduct a search of the image database based on the image feature data but not based on user feature data or group feature data to search for second one or more images. Server 130 may generate second object information of the object based on image information of the second one or more images and return the second object information to user device 110.

Figure 2A:
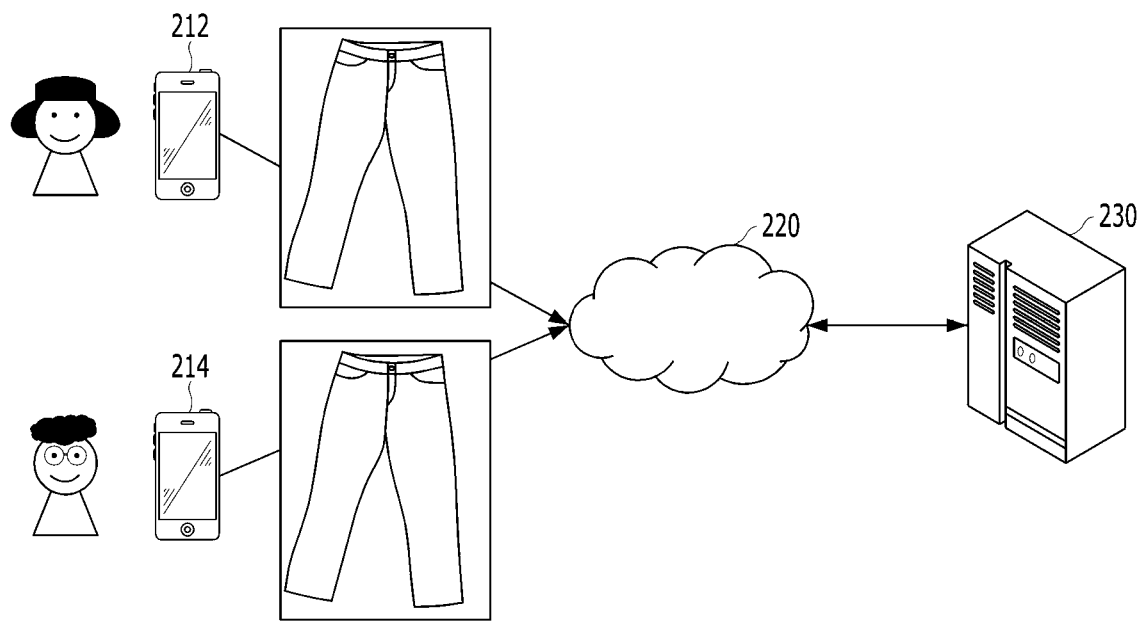
FIG. 2A shows an example that each of two user devices transmits an input image containing an object to a server.
Figure 2B:
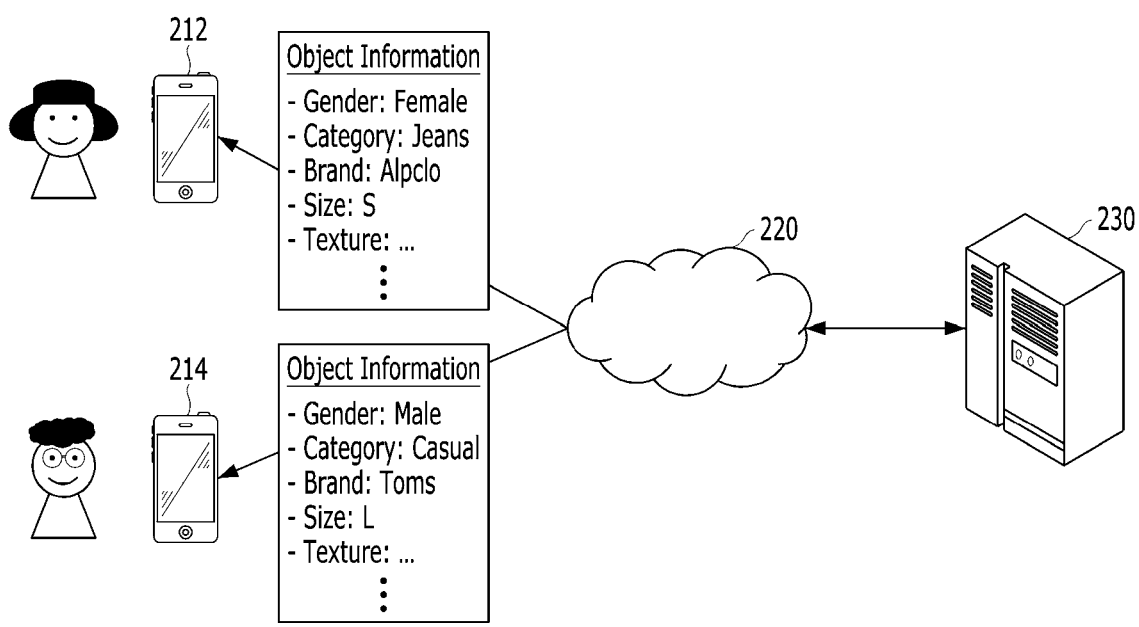
FIG. 2B shows an example that each of the two user devices receives, from the server, object information in response to the transmission of the input image, arranged in accordance with at least some embodiments described herein.

FIG. 2A shows an example that each of two user devices transmits an input image containing an object to a server, and FIG. 2B shows an example that each of the two user devices receives, from the server, object information in response to the transmission of the input image, arranged in accordance with at least some embodiments described herein. As depicted in FIG. 2A, assuming that two different users of user devices 212 and 214 upload a same input image, for example, of trousers, users of user devices 212 and 214 may transmit the input image to a server 230 via a network 220.

Server 230 may obtain the input image and user identifiers. The user of user device 212 has different characteristics from the user of user device 214. That is, user information of the user of user device 212 is different from that of the user of user device 214. Server 230 may preprocess the input image and user identifier of the user of user device 212 to produce image feature vector and first user feature data. Further, server 230 may preprocess the input image and user identifier of the user of user device 214 to produce image feature vector and second user feature data. Server 230 may conduct a search of an image database to search for first one or more images and generate first object information. Further, server 230 may conduct a search of the image database to search for second one or more images and generate second object information.

As shown in FIG. 2B, in response to transmitting the input image, user device 212 may receive the object information of the trousers shown in the input image of "Gender: Female; Category: Jeans; Brand: Alpclo; Size: S; Texture: . . . ." Further, user device 214 may receive the different object information of the trousers of "Gender: Male; Category: Casual; Brand: Toms; Size: L; Texture: . . . ."

In typical image recognition techniques, information of an object contained in an image can be extracted from the image itself. However, since there are various types of items, such extracted information may have a wide range or may include inaccurate information. Characteristics of a user can affect to tendencies and/or statistics for items relating to the user. Such tendencies and/or statistics can be more clearly understood by understanding the user group of multiple users associated with the user. In this regard, when performing image recognition, it is possible to improve the accuracy of object information by not only using the image itself but also using information of user or user group.

Figure 3:
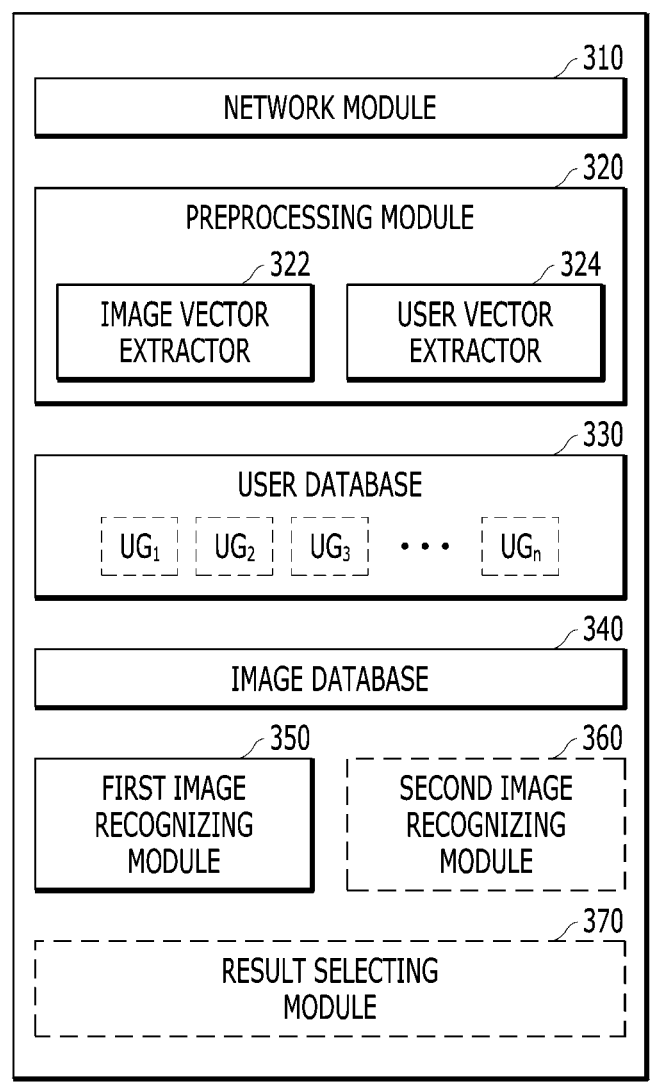
FIG. 3 shows a block diagram of an exemplary server, arranged in accordance with at least some embodiments described herein.

FIG. 3 shows a block diagram of an exemplary server, arranged in accordance with at least some embodiments described herein. As illustrated, a server 300 may include a network module 310, a preprocessing module 320, a user database 330, an image database 340 and a first image recognizing module 350. Additionally or optionally, server 300 may further include a second image recognizing module 360 and/or a result selecting module 370. Server 300 may be implemented as a single computing device, a server farm comprising multiple servers, a distributed network, a cloud-computing configuration and/or the like.

In some embodiments, network module 310 may be configured to exchange data with a user device (such as, for example, user device 110 in FIG. 1) via a network (such as, for example, network 120 in FIG. 1). A user of the user device may choose an input image by using the user device and the user device may transmit information regarding the input image to a server 300. Network module 310 may obtain the input image from the user device and a user identifier of the user.

Preprocessing module 320 may include an image vector extractor 322 and a user vector extractor 324. Image vector extractor 322 may be configured to preprocess the input image to produce image feature data of the input image. Image vector extractor 322 may perform one or more preprocesses including, for example, resizing the input image, segmenting the input image, cropping the input image, transforming the input image, changing colors of the input image, brightness of the input image, contrasts of the input image, etc. to facilitate producing the image feature data. Image vector extractor 322 may extract the image feature data using the preprocessed input image. The extracted image feature data may be related to the object contained in the input image. The image feature data may include at least one of, for example, vectors, graphs and images. Image vector extractor 322 may store the image feature data in image database 340.

User vector extractor 324 may be configured to preprocess user information corresponding to the user identifier to produce user feature data of the user. User database 330 may be configured to store user identifiers and user information for a plurality of users. User information may include at least one of demographic information and behavior information. The demographic information may include, for example, age, gender, location, address, profession, etc. The behavior information may include, for example, visited categories, preferred brand names, browsing history, application usage frequency, purchased history, etc. Further, user database 330 may be configured to further store image listing history and/or item listing history for each user.

In some examples, user vector extractor 324 may search for the user identifier from user database 330 and read user information corresponding to the user identifier. User vector extractor 324 may encode the user information, for example, using multi-hot encoding techniques to produce the user feature data and quantize the user feature data to adjust or reduce the size or the length of the user feature data. User vector extractor 324 may store the produced user feature data in user database 330.

In some examples, preprocessing module 320 may group the plurality of users stored in user database 330 into a plurality of user groups $UG_1, UG_2, UG_3, \ldots, UG_n$ based on user information of each of the plurality of users; and extract group feature data of each user group based on user information of one or more users in a same group. In some examples, group feature data of each user group may be obtained by combining the user feature data of one or more users in a same group. As such, in addition to the user identifiers and user information, user database 330 may also store user feature data for each user, group information of each of the plurality of user groups $UG_1, UG_2, UG_3, \ldots, UG_n$ and the plurality of group feature data in user groups $UG_1, UG_2, UG_3, \ldots, UG_n$. The user feature data and the group feature data may include, for example, one or more feature vectors. Preprocessing module 320 may be configured to update user database 330 with a predetermined frequency. Preprocessing module 320 may update at least one of user information, user feature data, the group information of user groups and group feature data of user groups $UG_1, UG_2, UG_3, \ldots, UG_n$. Further, user database 330 may be configured to further store image listing history and/or item listing history for each user group.

Image database 340 may be configured to store a plurality of images, each of which contains an item. Further, image database 340 may also store image feature data of each stored image. The image feature data may include at least one of, for example, feature vectors, graphs and images.

First image recognizing module 350 may be configured to determine a user group associated with the user based on the user feature data. In some examples, first image recognizing module 350 may read each group feature data of each user group of the plurality of user groups $UG_1, UG_2, UG_3, \ldots, UG_n$ stored in user database 330 and calculate a difference between the user feature data and the group feature data. The difference can be calculated by calculating, for example, a vector distance. First image recognizing module 350 may determine whether the calculated difference is within a predetermined value, and when the calculated difference is within the predetermined value, first image recognizing module 350 may determine such user group as a user group associated with the user. In some examples, when two or more user groups are determined, first image recognizing module 350 may select one user group with minimum difference as the user group associated with the user.

First image recognizing module 350 may be configured to conduct a search of image database 340 based on the image feature data and user-related data to search for first one or more images. For example, the user-related data may include, but not limited to, the user identifier, the user information, the user feature data, the group feature data and/or any information relating to the determined user group. In some examples, first image recognizing module 350 may conduct the search based on the image feature data and the group feature data of the determined user group. In some examples, user database 330 may store image listing history and/or item listing history for each user group. First image recognizing module 350 may read the image listing history and/or item listing history based on the group feature data and determine a plurality of images stored in image database 340. Then, first image recognizing module 350 may compare the image feature data relating to the object in the input image with feature data of each of the determined plurality of images. When difference between the image feature data relating to the object and the feature data of an image stored in image database 340 is within a predetermined value, first image recognizing module 350 may determine a corresponding image as one of the first one or more images relating to the object.

First image recognizing module 350 may be configured to generate first object information of the object based on image information of the first one or more images. Image database 340 may store image information for each image and the image information may include, for example, a title of the image, a category of an item in the image, a brand name of the item, detail descriptions of the item, etc. First image recognizing module 350 may read image information of the first one or more images from image database 340. Similarly, object information may include at least one of a title, a category, a brand name, detail descriptions, etc. of the object. In some examples, first image recognizing module 350 may determine one of the first one or more images based on similarity value with the input image and obtain image information of the determined image as the object information. In some other examples, first image recognizing module 350 may obtain the image information of the first one or more images. First image recognizing module 350 may select information for each feature of the object, such as a title, a category, a brand name, detail descriptions, etc. to generate the object information.

Additionally or optionally, second image recognizing module 360 may be configured to conduct a search of the image database based on the image feature data, but not based on the group feature data. In some examples, second image recognizing module 360 may compare the image feature data obtained by user vector extractor 324 with feature data of images stored in image database 340. When difference between the image feature data relating to the object and the feature data of an image stored in image database 340 is within a predetermined value, second image recognizing module 360 may determine a corresponding image as one of second one or more images relating to the object and generate second object information of the object based on image information of the second one or more images.

In further some examples, first image recognizing module 350 may determine a confidence value of the first object information when generating the first object information. The confidence value may be related to a similarity value between the input image and the first one or more images. Result selecting module 370 may compare the confidence value and a predetermined confidence value. When the confidence value of the first object information is higher than the predetermined confidence value, result selecting module 370 may select the first object information as object information of the object. Otherwise, if the confidence value of the first object information is not higher than the predetermined confidence value, result selecting module 370 may select the second object information as object information of the object.

In some examples, network module 310 may transmit at least some portion of the object information to the user device. In some other examples server 300 may formulate a search query to search for one or more objects associated with the object based on the object information. In such examples, server 300 may further conduct a search for the one or more objects based on the search query, and network module 310 may transmit the search result to the user device.

FIG. 4 illustrates an exemplary flow diagram of a process for providing image recognition, arranged in accordance with at least some embodiments described herein. A process 400 of FIG. 4 may be implemented using one or more computing devices, such as, for example, server 130, 230 or 300 described with reference to FIG. 1, 2A, 2B or 3, which may operatively communicate with a user device, such as, for example, user device 110, 212 or 214 described with reference to FIG. 1, 2A or 2B. Process 400 may include one or more operations, actions, or functions as illustrated by one or more of blocks S410, S420, S430, S440, S450 and/or S460. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. For example, blocks S420 and S430 can be performed in parallel. Process 400 may begin at block S410, "OBTAINING AN INPUT IMAGE CONTAINING AN OBJECT AND USER IDENTIFIER."

At block S410, the one or more computing devices may obtain an input image and a user identifier. In some examples, the one or more computing devices may obtain the input image through various ways as described above. The input image may contain an object. The user identifier may be associated with a user of the user device. Block S410 may be followed by block S420, "PREPROCESSING THE INPUT IMAGE TO PRODUCE IMAGE FEATURE DATA."

At block S420, the one or more computing devices may preprocess the input image to produce image feature data of the input image. In some examples, the one or more computing devices may preprocess the input image and extract the image feature data from the input image. The image feature data may include at least one of, for example, vectors, graphs and images. Block S420 may be followed by block S430, "PREPROCESSING USER INFORMATION CORRESPONDING TO THE USER IDENTIFIER."

At block S430, the one or more computing devices may preprocess user information corresponding to the user identifier to produce user feature data of the user. In some examples, the one or more computing devices may read the user information based on the user identifier and encode the user information to produce the user feature data. The one or more computing devices may store the produced user feature data in a user database, such as, for example, user database 330 of FIG. 3. Block S430 may be followed by block S440, "DETERMINING A USER GROUP TO OBTAIN GROUP FEATURE DATA OF THE USER GROUP."

At block S440, the one or more computing devices may determine a user group based on the user feature data to obtain group feature data of the user group. In some examples, the one or more computing devices may read each group feature data of each user group of a plurality of user group stored in the user database and calculate a difference between the user feature data and the group feature data, such as a vector distance. The one or more computing devices may determine a user group that the calculated difference is within a predetermined value. Block S440 may be followed by block S450, "CONDUCTING A SEARCH OF AN IMAGE DATABASE TO SEARCH FOR ONE OR MORE IMAGES."

At block S450, the one or more computing devices may conduct a search of the image database based on the image feature data and user-related data to search for first one or more images. In some examples, the one or more computing devices may conduct the search based on the image feature data and the group feature data of the determined user group. In some examples, the user database may store image listing history and/or item listing history for each user group. The one or more computing devices may read the image listing history and/or item listing history based on the group feature data, and according to the image listing history and/or item listing history, the one or more computing devices may determine a plurality of images stored in the image database. Then, one or more computing devices may compare the image feature data from the input image with feature data of each of such determined plurality of images. When difference between the image feature data from the input image and the feature data of an image from the image database is within a predetermined value, the one or more computing devices may determine a corresponding image as one of the first one or more images relating to the object. Block S450 may be followed by block S460, "GENERATING OBJECT INFORMATION OF THE OBJECT."

At block S460, the one or more computing devices may generate first object information of the object based on image information of the first one or more images. In some examples, the one or more computing devices may determine one of the first one or more images based on similarity value with the input image and obtain image information of the determined image as the object information. In some other examples, the one or more computing devices may obtain the image information of the first one or more images. The one or more computing devices may select information for each feature of the object to generate the object information.

Additionally or optionally, in some examples that the user is browsing or purchasing the object, the one or more computing devices may formulate a search query to search for one or more objects associated with the object based on the object information. The one or more computing devices or other computing devices may conduct an image search using the search query and return the search result to the user device.

Figure 5:
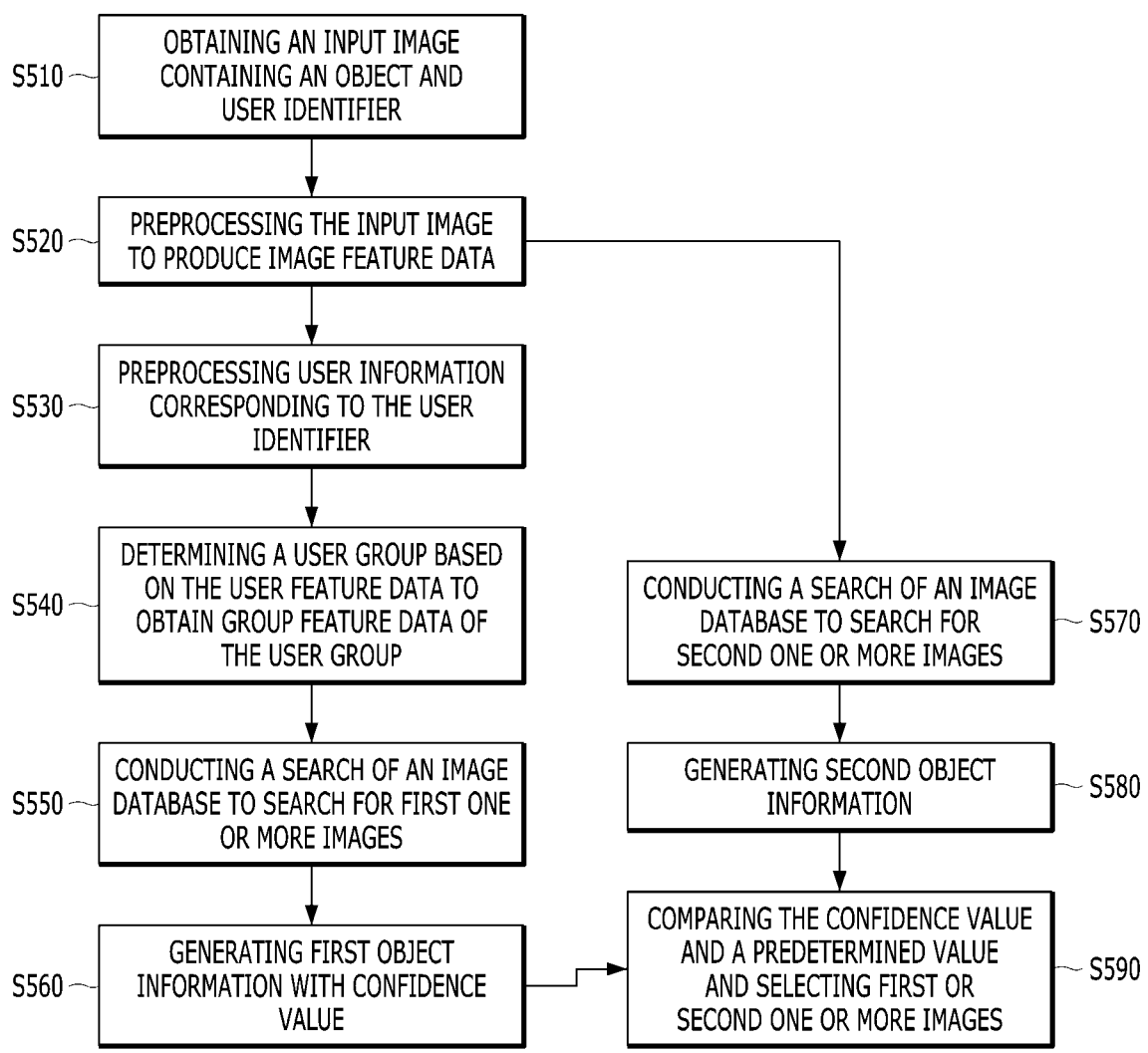
FIG. 5 illustrates another exemplary flow diagram of a process for providing image recognition, arranged in accordance with at least some embodiments described herein.

FIG. 5 illustrates another exemplary flow diagram of a process for providing image recognition, arranged in accordance with at least some embodiments described herein. A process 500 of FIG. 5 may be implemented using one or more computing devices, such as, for example, server 130, 230 or 300 described with reference to FIG. 1, 2A, 2B or 3, which may operatively communicate with a user device, such as, for example, user device 110, 212 or 214 described with reference to FIG. 1, 2A or 2B. Process 500 may include one or more operations, actions, or functions as illustrated by one or more of blocks S510, S520, S530, S540, S550, S560, S570, S580 and/or S590. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Since the detailed descriptions of blocks S410, S420, S430, S440, S450 and S460 of FIG. 4 can be applicable to Blocks S510, S520, S530, S540, S550 and S560, respectively, repetitive descriptions are omitted for simplicity and clarity. Block S520, "PREPROCESSING THE INPUT IMAGE TO PRODUCE IMAGE FEATURE DATA" may be followed by block S530 and also block S570, "CONDUCTING A SEARCH OF AN IMAGE DATABASE TO SEARCH FOR SECOND ONE OR MORE IMAGES."

At block S570, the one or more computing devices may conduct a search of the image database based on the image feature data. In some examples, the one or more computing devices may compare the image feature data obtained at block S520 with feature data of images stored in an image database. When difference between the image feature data relating to the object and the feature data of an image stored in the image database is within a predetermined value, the one or more computing devices may determine a corresponding image as one of the second one or more images relating to the object. Block S570 may be followed by block S580, "GENERATING SECOND OBJECT INFORMATION."

At block S580, the one or more computing devices may generate second object information of the object based on image information of the second one or more images. In some examples, the one or more computing devices may determine one of the second one or more images based on similarity value with the input image and obtain image information of the determined image as second object information. In some other examples, the one or more computing devices may obtain image information of the second one or more images and select information each feature of the object to generate the second object information.

Meanwhile, as shown in FIG. 5, one or more images searched by the one or more computing devices at block S550 are first one or more images; and the generated object information generated by the one or more computing devices at block S560 is first object information. At block S560, the one or more computing devices may determine a confidence value of the first object information. The confidence value may be related to a similarity value between the input image and the first one or more images. Block S560 and Block S580 may be followed by block S590, "COMPARING THE CONFIDENCE VALUE AND SELECTING FIRST OR SECOND ONE OR MORE IMAGES."

At block S590, the one or more computing devices may compare the confidence value and a predetermined confidence value. When the confidence value of the first object information is higher than the predetermined confidence value, the one or more computing devices may select the first object information as object information of the object. Otherwise, if the confidence value of the first object information is not higher than the predetermined confidence value, the one or more computing devices may select the second object information as object information of the object.

Figure 6:
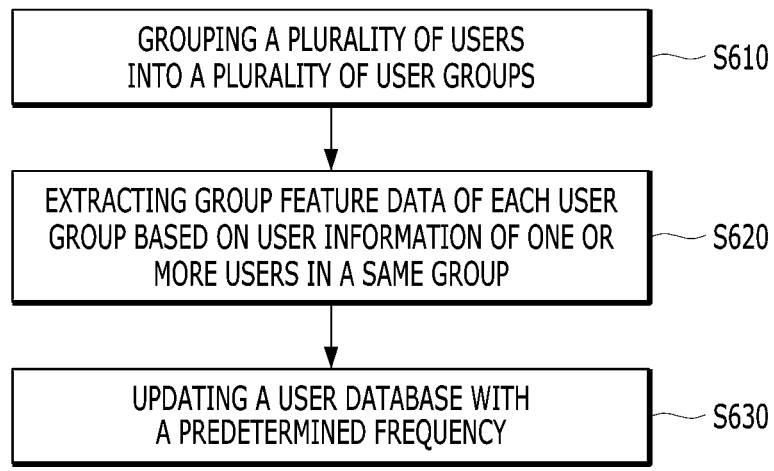
FIG. 6 illustrates an exemplary flow diagram of a further process for providing image recognition, arranged in accordance with at least some embodiments described herein.

FIG. 6 illustrates an exemplary flow diagram of a further process for providing image recognition, arranged in accordance with at least some embodiments described herein. A process 600 of FIG. 6 may be implemented using one or more computing devices, for example, server 130, 230 or 300 described with reference to FIG. 1, 2A, 2B or 3. Process 600 may be carried out before, after and/or during process 400 as illustrated in FIG. 4 or process 500 as illustrated in FIG. 5.

Process 600 may include one or more operations, actions, or functions as illustrated by one or more of blocks S610, S620 and/or S630. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Process 600 may begin at block S610, "GROUPING A PLURALITY OF USERS INTO A PLURALITY OF USER GROUPS."

At block S610, the one or more computing devices may group a plurality of users into a plurality of user groups. In some examples, the one or more computing devices and/or other computing devices communicatively connected to such one or more computing devices may include a user database. The user database may store user identifiers and user information for a plurality of users. User information may include at least one of demographic information and behavior information. The one or more computing devices may group the plurality of users stored in the user database into a plurality of user groups based on user information of each of the plurality of users. Block S610 may be followed by block S620, "EXTRACTING GROUP FEATURE DATA OF EACH USER GROUP BASED ON USER INFORMATION OF ONE ORE MORE USERS IN A SAME GROUP."

At block S620, the one or more computing devices may extract group feature data of each user group based on user information of one or more users in a same group. The one or more computing devices may produce user feature data of each user based on their user information and extract group feature data, for example, by combining the user feature data of one or more users in a same group. The user feature data and the group feature data may include, for example, one or more feature vectors. Block S620 may be followed by block S630, "UPDATING A USER DATABASE WITH A PREDETERMINED FREQUENCY."

At block S630, the one or more computing devices may update the user database with a predetermined frequency. The one or more computing devices may update at least one of user information, user feature data, user groups and group feature data of user groups.

Figure 7A:
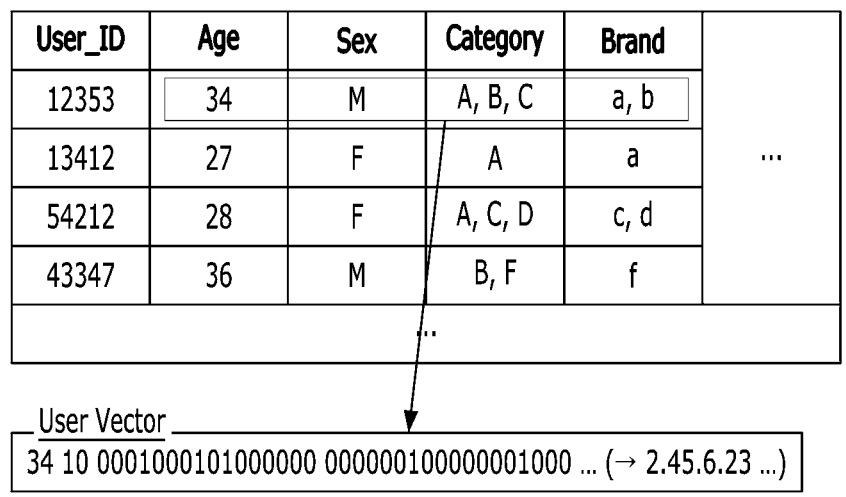

FIG. 7A shows a portion of a user database and FIG. 7B shows another portion of the user database, arranged in accordance with at least some embodiments described herein. As depicted in FIG. 7A, the user database may include multiple columns of data for each user. The multiple columns may include, for example, user identifier and user information regarding age, gender, visited categories, preferred brand names, image/item listing history, etc. In an example, a computing device according to the present disclosure may extract a user vector using the user information. As depicted in FIG. 7A, in order to extract a user vector of user 12353, the computing device may read user information of 34 of age, M of gender, A, B and C of categories, a and b of brand names, etc., from the user database. The computing device may encode the user information to produce the user vector of 34 10 0001000101000000 000000100000001000 . . . indicated in the below of FIG. 7A as user feature data in accordance with the present disclosure. In some examples, the computing device may use any suitable encoding techniques, such as, for example, multi-hot encoding techniques. Further, the computing device may quantize the produced user vector to adjust or reduce the size or the length of the user vector. For example, the user vector of 34 10 0001000101000000 000000100000001000 may be quantized into the quantized user vector 2.45.6.23 . . . . In some examples, the computing device may store the produced user vector for each user in the user database as the user feature data.

The computing device may group the plurality of users 12353, 13412, 54212, 43347, etc. stored as shown in FIG. 7A into a plurality of user groups Group 1, Group 2, etc. based on the user information and extract a group vector of each user group as shown in FIG. 7B in accordance with the present disclosure. The group vector is one example of a group feature data in accordance with the present disclosure. In an example, the computing device may group the plurality of users 12353, 13412, 54212, 43347, etc. into Group 1, Group 2, etc., for example, by comparing the user vectors of the users. Further, the computing device may produce the group vectors, for example, by combining the user vectors of the users in a same group. As depicted in FIG. 7B, the user database may include multiple columns of data for each user group. The multiple columns may include, for example, a group name (identifier), group information regarding a group vector, user list of the user group, image vectors along with the image/item listing history, categories, preferred brand names, etc. In an example, the computing device may compare the user vector with user group vector of each group of Group 1, Group 2, etc.; determine a user group (Group 1); obtain group vector of 2. 45. 7. 12 . . . . ; and determine a plurality of images having image vectors 66. 23. 45. 76. 12. . . . , 67. 73. 54. 19. 65 . . . . , etc. Thereafter, the computing devices may compare image vector extracted from an input image with each of image vectors 66. 23. 45. 76. 12. . . . , 67. 73. 54. 19. 65 . . . . , etc. to search for one or more images.

Figure 8:
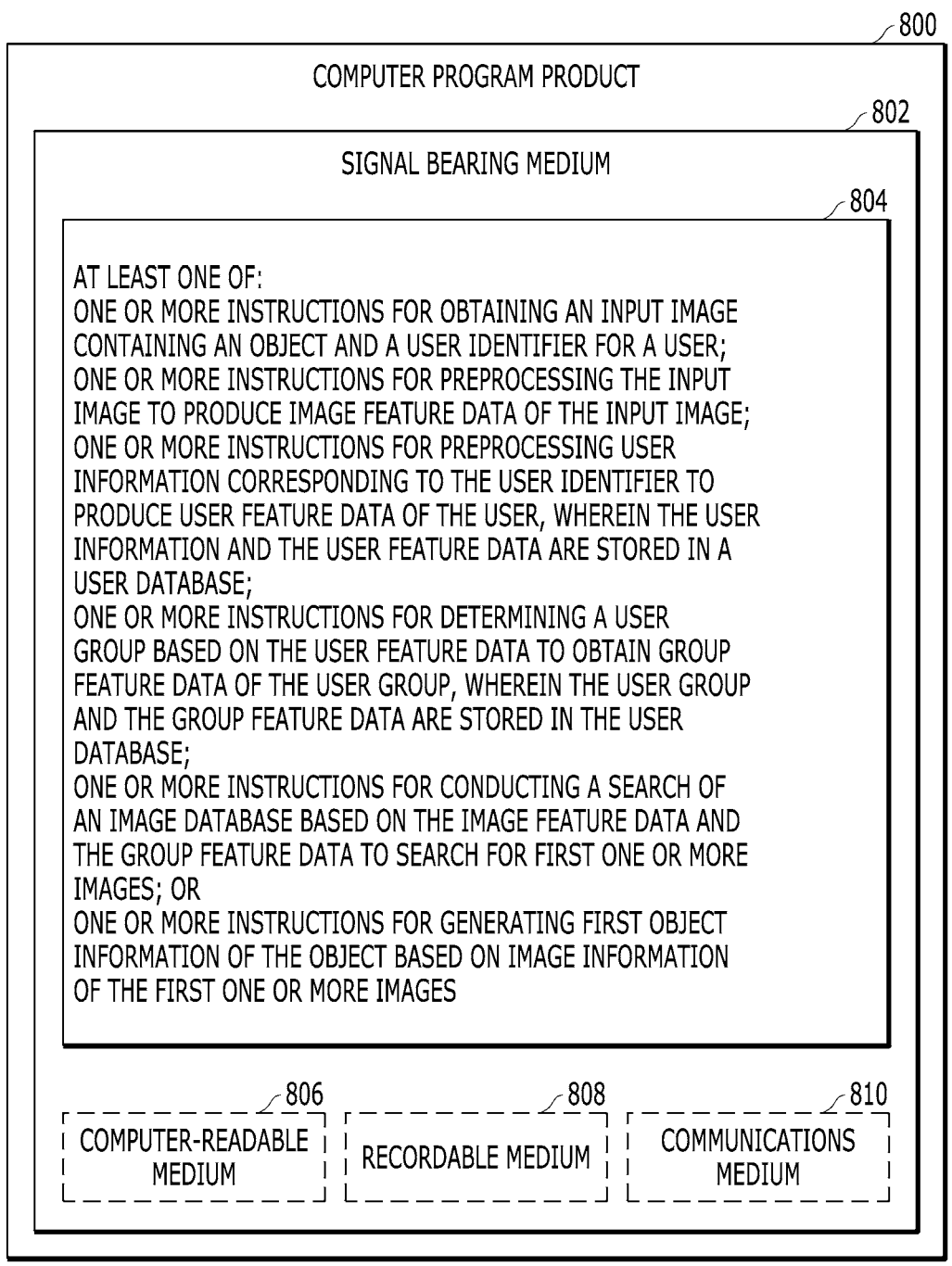
FIG. 8 illustrates a computer program product that may be utilized to perform image recognition, arranged in accordance with at least some embodiments described herein.

FIG. 8 illustrates a computer program product 800 that can be utilized to provide image recognition, in accordance with at least some embodiments described herein. Computer program product 800 may include a signal bearing medium 802. Signal bearing medium 802 may include one or more instructions 804 that, in response to execution by, for example, one or more processors, may provide the functionality and features described above with respect to FIGS. 1-7. By way of example, instructions 804 may include at least one of: one or more instructions for obtaining an input image containing an object and a user identifier for a user; one or more instructions for preprocessing the input image to produce image feature data of the input image; one or more instructions for preprocessing user information corresponding to the user identifier to produce user feature data of the user, wherein the user information and the user feature data are stored in a user database; one or more instructions for determining a user group based on the user feature data to obtain group feature data of the user group, wherein the user group and the group feature data are stored in the user database; one or more instructions for conducting a search of an image database based on the image feature data and the group feature data to search for first one or more images; or one or more instructions for generating first object information of the object based on image information of the first one or more images. Thus, for example, referring to FIGS. 1-3, server 130, 230 or 300 may undertake one or more of the blocks shown in FIGS. 4-5 in response to instructions 804.

In some implementations, signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of a computing device such as for example, server 130, 230 or 300 by an RF signal bearing medium 802, where the signal bearing medium 802 is conveyed by a wireless communications medium 810 (e.g., a wireless communications medium conforming with the IEEE 802.11 standard).

Figure 9:
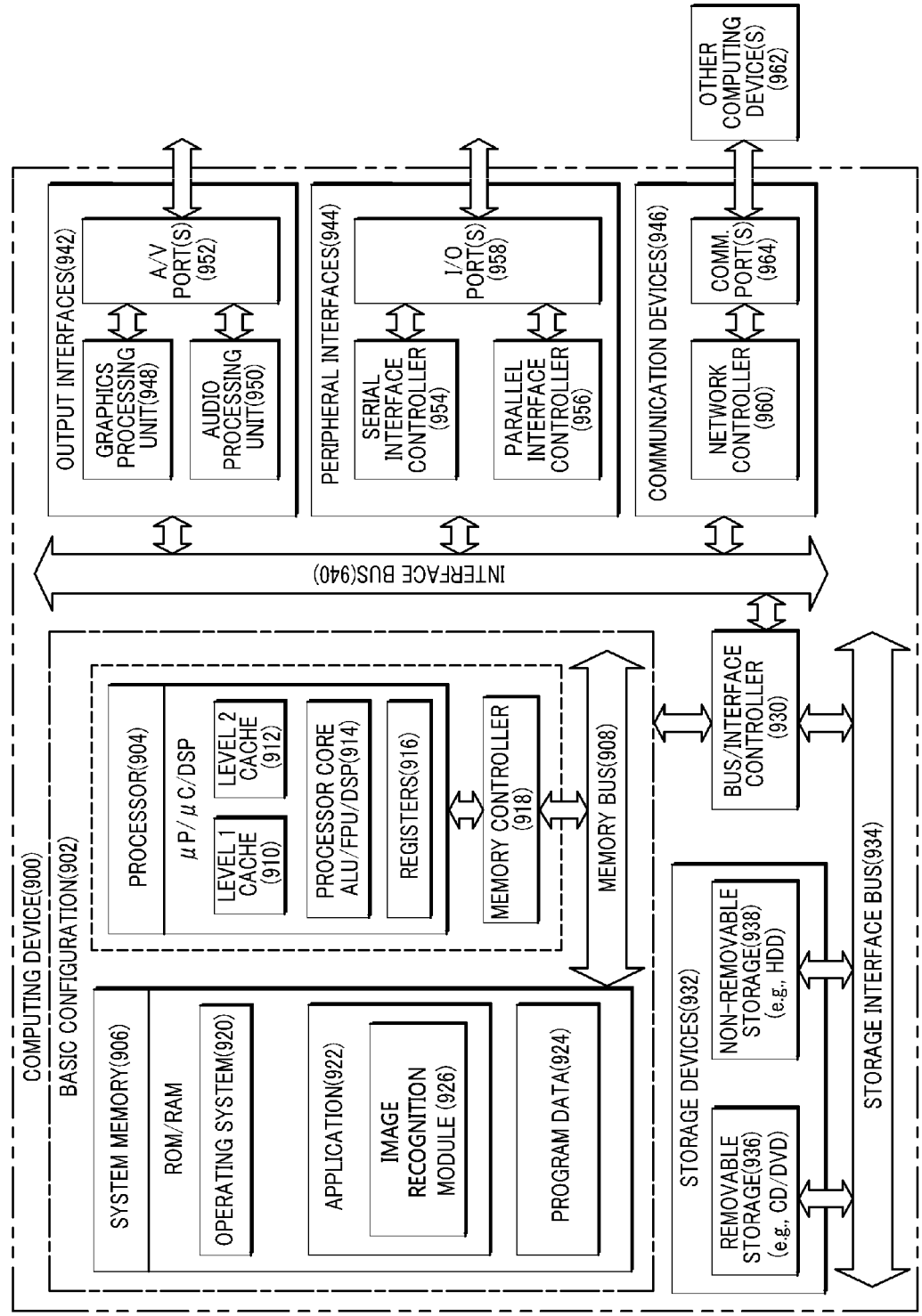
FIG. 9 shows is a block diagram illustrating an exemplary computing device that can be configured for image recognition, arranged in accordance with at least some embodiments described herein.

FIG. 9 is a block diagram illustrating an exemplary computing device that may be utilized to implement a beacon, arranged in accordance with at least some embodiments described herein.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one or more levels of caching, such as a level one cache 910 and a level two cache 912, a processor core 914, and registers 916. An exemplary processor core 914 may include an arithmetic logic unit (ALU), a floating point unit (FPU), a digital signal processing core (DSP Core), or any combination thereof. An exemplary memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include an image recognition module 926 that may be arranged to perform the operations and/or functions as described herein including the actions described with respect to architectures of server 130, 230 or 300 as shown in FIGS. 1-3 or including the actions described with respect to the flow chart shown in FIGS. 4-6. Program data 924 may include any data that may be useful for providing the image recognition scheme as is described herein. In some examples, application 922 may be arranged to operate with program data 924 on an operating system 920 such that the personalized image recognition scheme as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Exemplary computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An exemplary communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method performed using one or more computing devices that are communicatively connected with a user device associated with a user, the method comprising:
    obtaining an input image containing an object and a user identifier for the user of the user device;
    preprocessing the input image to produce an image feature vector corresponding to the input image;
    preprocessing user information corresponding to the user identifier to produce user feature data of the user, wherein the user information and the user feature data are stored in a user database;
    determining a user group associated with the user based on the user feature data to obtain group feature data of the user group, wherein the user group and the group feature data are stored in the user database;
    conducting a search of an image database based on the image feature vector and the group feature data;
    retrieving first one or more images from the image database in accordance with the search;
    calculating a difference between the image feature vector corresponding to the input image and respective feature data of each of the first one or more images;
    in accordance with a determination that the difference between the image feature vector corresponding to the input image and the feature data of an image of the first one or more images is within a predetermined value:
        determining the image of the first one or more images as an image relating to the object; and generating first object information of the object based on image information of the image of the first one or more images.

2. The method of claim 1, wherein each of the the user feature data and the group feature data includes one or more feature vectors.

3. The method of claim 1, wherein the user information includes at least one of demographic information of the user and behavior information of the user.

4. The method of claim 1, wherein preprocessing the user information includes:
   encoding the user information to produce the user feature data; and
   quantizing the produced user feature data.

5. The method of claim 1, wherein determining the user group associated with the user includes determining whether a difference between the user feature data and the group feature data is within a predetermined value.

6. The method of claim 1, further comprising:
   conducting a search of the image database based on the image feature vector to search for second one or more images; and
   generating second object information of the object based on image information of the second one or more images.

7. The method of claim 6, wherein generating the first object information includes determining a confidence value of the first object information,
   wherein the method further comprises:
   comparing the confidence value and a predetermined value; and
   in response to the determination that the confidence value is higher than the predetermined value, selecting the first object information as object information of the object.

8. The method of claim 1, further comprising, prior to the obtaining of the input image:
   grouping a plurality of users stored in the user database into a plurality of user groups including the user group based on user information of each user; and
   extracting group feature data of each user group based on user information of one or more users in a same group.

9. The method of claim 8, further comprising updating the user database with a predetermined frequency.

10. The method of claim 1, further comprising formulating a search query to search for one or more objects associated with the object contained in the input image based on the first object information.

11. A computing device, comprising:
   at least one processor; and
   at least one memory storing instructions that, when executed by the at least one processor, cause the at least one processor to perform operations comprising:
   obtaining an input image containing an object and a user identifier for a user of a user device that is communicatively connected with the computing device;
   preprocessing the input image to produce an image feature vector corresponding to the input image;
   preprocessing user information corresponding to the user identifier to produce user feature data of the user, wherein the user information and the user feature data are stored in a user database;
   determining a user group associated with the user based on the user feature data to obtain group feature data of the user group, wherein the user group and the group feature data are stored in the user database;
   conducting a search of an image database based on the image feature vector and the group feature data;
   retrieving first one or more images from the image database in accordance with the search;
   calculating a difference between the image feature vector corresponding to the input image and respective feature data of each of the first one or more images;
   in accordance with a determination that the difference between the image feature vector corresponding to the input image and the feature data of an image of the first one or more images is within a predetermined value:
      determining the image of the first one or more images as an image relating to the object; and
      generating first object information of the object based on image information of the first one or more images.

12. The computing device of claim 11, wherein determining the user group associated with the user includes determining whether a difference between the user feature data and the group feature data is within a predetermined value.

13. The computing device of claim 11, wherein generating the first object information includes determining a confidence value of the first object information, wherein the operations further comprise:
   conducting a search of the image database based on the image feature vector to search for second one or more images;
   generating second object information of the object based on image information of the second one or more images;
   comparing the confidence value and a predetermined value; and
   in response to the determination that the confidence value is higher than the predetermined value, selecting the first object information as object information of the object.

14. The computing device of claim 11, wherein the operations further comprise:
   prior to the obtaining of the input image:
   grouping a plurality of users stored in the user database into a plurality of user groups including the user group based on user information of each user; and
   extracting group feature data of each user group based on user information of one or more users in a same group.

15. A non-transitory computer-readable storage medium having stored therein instructions executable by a computing device to cause the computing device to perform operations comprising:
   obtaining an input image containing an object and a user identifier for a user of a user device that is communicatively connected with the computing device;
   preprocessing the input image to produce an image feature vector corresponding to the input image;
   preprocessing user information corresponding to the user identifier to produce user feature data of the user, wherein the user information and the user feature data are stored in a user database;
   determining a user group associated with the user based on the user feature data to obtain group feature data of the user group, wherein the user group and the group feature data are stored in the user database;
   conducting a search of an image database based on the image feature vector and the group feature data;
   retrieving first one or more images from the image database in accordance with the search;
   calculating a difference between the image feature vector corresponding to the input image and respective feature data of each of the first one or more images;

in accordance with a determination that the difference between the image feature vector corresponding to the input image and the feature data of an image of the first one or more images is within a predetermined value:
  determining the image of the first one or more images as an image relating to the object; and
  generating first object information of the object based on image information of the first one or more images.

16. The non-transitory computer-readable storage medium of claim 15, wherein the user information includes at least one of demographic information of the user and behavior information of the user.

17. The non-transitory computer-readable storage medium of claim 15, wherein preprocessing the user information includes:
  encoding the user information to produce the user feature data; and
  quantizing the produced user feature data.

18. The non-transitory computer-readable storage medium of claim 15, wherein determining the user group associated with the user includes determining whether a difference between the user feature data and the group feature data is within a predetermined value.

19. The non-transitory computer-readable storage medium of claim 15, wherein generating the first object information includes determining a confidence value of the first object information, wherein the operations further comprise:
  conducting a search of the image database based on the image feature vector to search for second one or more images;
  generating second object information of the object based on image information of the second one or more images;
  comparing the confidence value and a predetermined value; and
  in response to the determination that the confidence value is higher than the predetermined value, selecting the first object information as object information of the object.

20. The non-transitory computer-readable storage medium of claim 15, wherein the operations further comprise:
  prior to the obtaining of the input image,
  grouping a plurality of users stored in the user database into a plurality of user groups including the user group based on user information of each user; and
  extracting group feature data of each user group based on user information of one or more users in a same group.

* * * * *